Hilbright & Reynold.
Leather Worker.
N°. 65,672.  Patented Jun. 11, 1867.
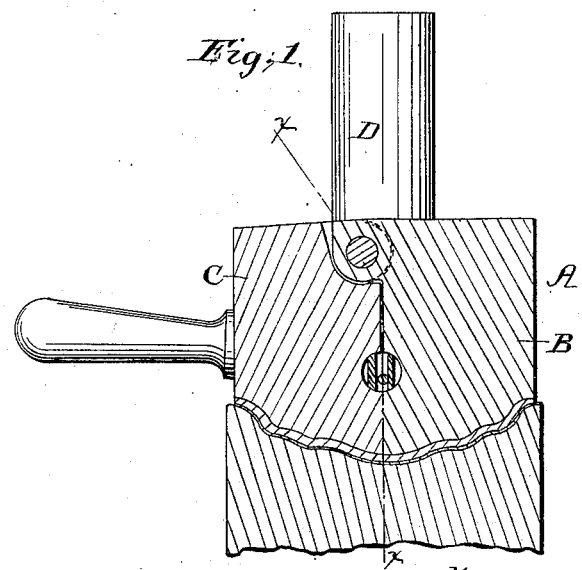
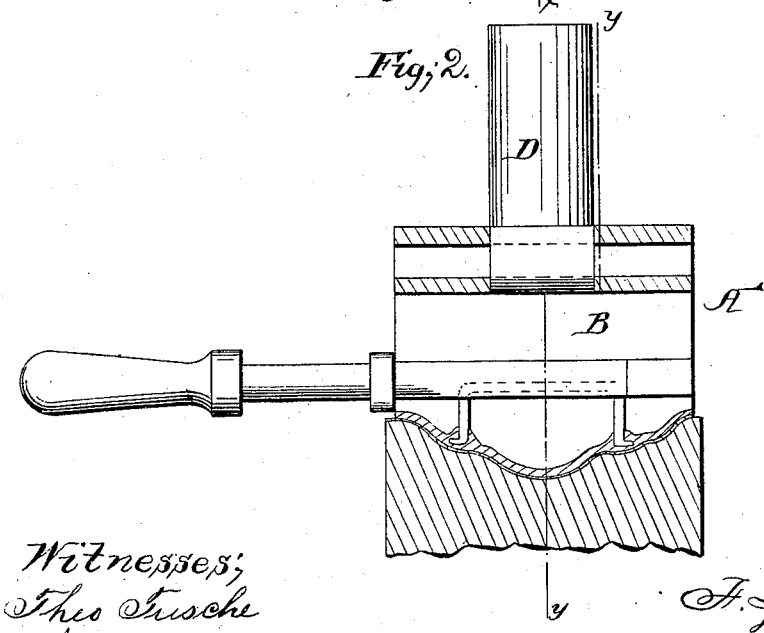
Witnesses;
Theo Tusche
Wm Truvin
Inventors;
F. L. Hilbright
F. Reynolds
Per Munn & Co
Attorneys

United States Patent Office.

F. LOUIS HILBRIGHT AND FREDERICK REYNOLD, OF NEWARK, NEW JERSEY.

Letters Patent No. 65,672, dated June 11, 1867.

IMPROVEMENT IN ROSETTES.

The Schedule referred to in these Letters Patent and making part of the same.

TO ALL WHOM IT MAY CONCERN:

Be it known that we, F. LOUIS HILBRIGHT and FREDERICK REYNOLD, of Newark, Essex county, New Jersey, have invented a new and useful improvement in the Manufacture of Rosettes; and we do hereby declare that the following is a full, clear, and exact description thereof, which will enable others skilled in the art to make and use the same, reference being had to the accompanying drawings forming part of this specification.

This invention relates to the manner of securing the loops to the backs of the rosette plate, and for this purpose it consists in forming the upper chuck of a foot lever, or other press, in two parts or sections, one of which is fixed to the plunger, with the other hinged to it at its upper part, and in so constructing the two faces of such chuck, in contact with each other, as to receive and hold the loop, when, having properly placed the rosette or shell on the lower die, and fitted it with the requisite quantity of the filling metal commonly used, which is a mixture of tin and lead, bring the upper chuck or die down upon the said rosette, whereby the loop is thus securely fastened and attached to the same by means of the filling material, which at the same time is evenly diffused and spread over the surface of the rosette. In the accompanying plate of drawings, our improvement in the manufacture of rosettes is illustrated—

Figure 1 being a transverse vertical section through the upper die or chuck of the press; and
Figure 2, a central section in the line of the division of the chuck into two parts.
Similar letters of reference indicate corresponding parts.

A, in the drawings, represents the upper chuck or die of the press, which chuck is made in two parts or sections, B and C; the one, B, fixed to the plunger-rod D, and the other, C, so hinged to it at its upper part as to open from and close upon the stationary section B. The faces of the chuck or die A in contact with each other are constructed to receive the ordinary metallic loop of rosettes, for the insertion of which an implement, such as is shown in the drawings, is employed, when, closing the two sections of the chuck upon each other, such loop is firmly held, and with its feet or ends projecting from the face of the die, so that when the die is brought down upon the rosette on the lower die, as shown in the drawings, it will be united thereto, provided the said rosette has been first filled with the requisite quantity of filling material or metal, usually composed of tin and lead.

Among the many advantages of our improved mode of securing the loops to rosettes may be mentioned that they can be filled more evenly and with greater rapidity and exactness, and that the loop will be also secured in its proper and desired place.

We claim as new, and desire to secure by Letters Patent—

The die A, consisting of the part B, fixed to the flanged rod, the part C hinged to the part B, their pieces in contact with each other, constructed to receive and hold the metallic loop of rosettes; said die A being brought down upon the rosette in the lower die and uniting the loop thereto as herein set forth for the purpose specified.

The above specification of our invention signed by us this    day of January, 1867.

FR. LOUIS HILBRIGHT,
F. REYNOLD.

Witnesses:
N. P. COMPTON,
MARTIN L. STOLL.